May 5, 1959    W. M. CHANDLER ET AL    2,884,901
SILENCER FOR AIR VIBRATORS
Filed Nov. 5, 1957
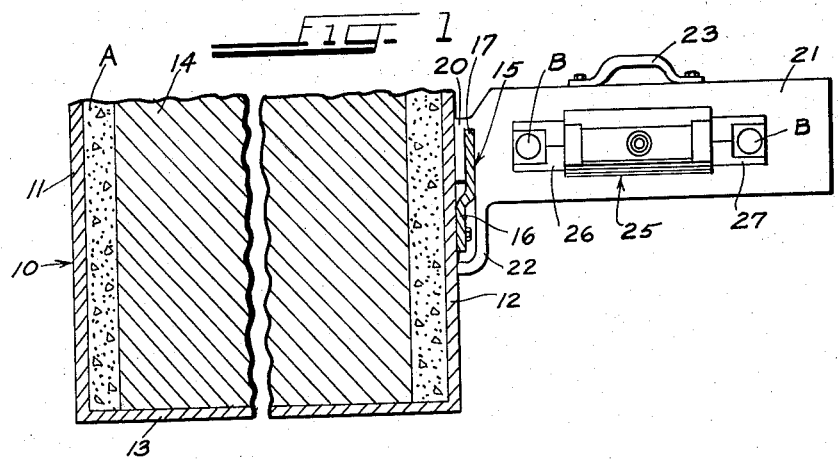
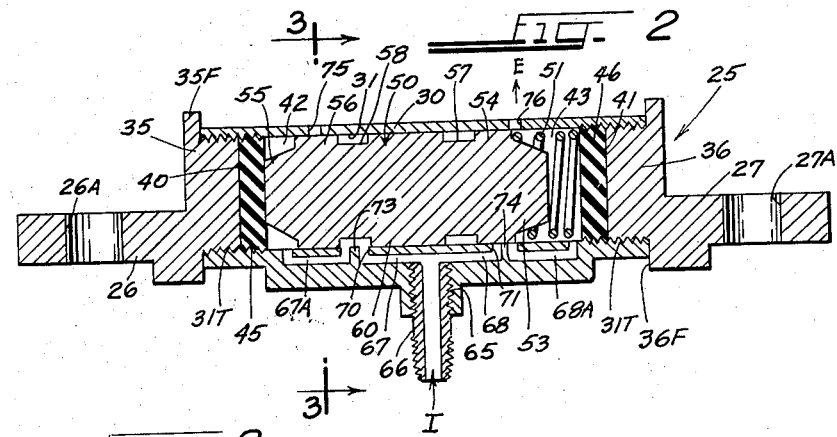
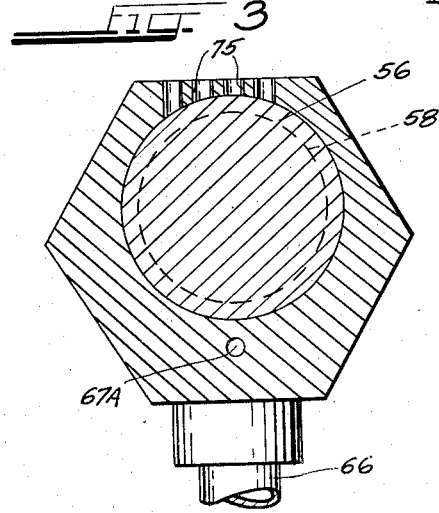
INVENTORS:
WESLEY M. CHANDLER
PAUL FRED HEUSER
BY
*Wallace and Cannon*
ATTYS.

United States Patent Office 2,884,901
Patented May 5, 1959

2,884,901
SILENCER FOR AIR VIBRATORS

Wesley M. Chandler and Paul Fred Heuser,
St. Paul, Minn.

Application November 5, 1957, Serial No. 694,597

1 Claim. (Cl. 121—17)

This invention relates to a pneumatically operated vibrator, and in particular to an arrangement for assuring relatively silent operation thereof.

Air-operated vibrators are used for various different purposes, and one of the principal uses is for vibrating a mold such as a mold for cementitious material to assure proper solidification and densification of the material being molded or cast. It will be realized that the noise induced by such mold vibrators can be most severe in a confined mold room or in a mold room where numerous molds are being vibrated in the foregoing manner. Moreover, the noise set up by a pneumatic vibrator represents an industrial nuisance, and there are many employees who simply cannot stand such noise for any prolonged period. The noise produced by a pneumatic vibrator is caused by the ends of the reciprocating piston striking the heads of the cylinder in which the piston is mounted, and it will be moreover recognized that such repeated striking produces a great deal of wear on the piston and the heads of the cylinder manifest in peening and swaging. It has been further observed that there can be some stripping of the threads formed in the cylinder and in the cylinder heads for removably mounting the heads to the cylinder.

In view of the foregoing, it is the object of the present invention to substantially silence operation of a pneumatic vibrator, and to reduce wear on the piston and cylinder heads, and to prevent damage to the threads joining the cylinder and a cylinder head. Specifically, it is the object of the present invention to achieve the foregoing objects by facing the inner faces of cylinder heads of a pneumatic vibrator with resilient material such as oil-resistant synthetic rubber or the like.

Other and further objects of the present invention will be apparent from the following description and claim and are illustrated in the accompanying drawing which, by way of illustration, shows a preferred embodiment of the present invention and the principle thereof and what we now consider to be the best mode in which we have contemplated applying that principle. Other embodiments of the invention embodying the same or equivalent principle may be used and structural changes may be made as desired by those skilled in the art without departing from the present invention and the purview of the appended claim.

In the drawings:

Fig. 1 is a sectional view of a mold having a vibrator of the present invention mounted on one of the side walls thereof;

Fig. 2 is a longitudinal sectional view of the vibrator of the present invention; and Fig. 3 is a sectional view taken substantially on the line 3—3 of Fig. 2.

In Fig. 1 of the drawing, there is illustrated a section of a typical mold 10 including side walls 11 and 12 and a bottom wall 13 for molding cementitious material. The mold 10 is shown as including a core 14 having side faces spaced inwardly of the inner faces of the side walls 11 and 12 defining a mold cavity for concrete aggregate A.

It is conventional to induce densification of the concrete slurry poured into the mold cavity afforded by a mold as 10 by having resort to a pneumatic vibrator mounted on one of the sides of the mold. Thus, as shown in Fig. 1, the mold 10 is provided on the side wall 12 with a holding flange 15 having one leg 16 fastened securely to the side wall 12 of the mold and another leg 17 offset outwardly relative to the leg 16. The flange 15 thus provided enables the hook 20 of a vibrator pallet plate 21 to be hooked into the space between the leg 17 and the opposed face of the mold side wall. The vibrator pallet plate is further stabilized by a substantially J-shaped arm 22 depending therefrom which has a free inwardly directed end engaging the mold side wall just below the lower end of the leg 16 of the flange 15. This of course, is not part of the present invention and merely serves to illustrate one mode of associating the plate 21 with a mold as 10.

The vibrator pallet plate is provided with a handle 23 for convenient carrying, and a vibrator 25 constructed in accordance with the present invention is rigidly mounted on the side of the plate 21 by bolts B or the like which are passed through openings in a pair of flanges 26 and 27 provided on the vibrator 25. Such openings are of course aligned with openings in the plate 21, and the threaded ends of the bolts project from the back side of the plate 21 as viewed in Fig. 1 and are fastened down by the usual nut and lock washer assemblies. It will be appreciated that this again represents simply one convenient mode of securing the vibrator 25 to the plate 21, and various different arrangements may be resorted to for this purpose.

The details of construction of the vibrator 25 are shown in Figs. 2 and 3. Thus, the vibrator 25 is of heavy duty construction and includes a thick-walled cylinder 30 having a cylindrical bore 31. The opposed ends of the bore 31 are threaded at 31T, and cylinder heads 35 and 36 are threadedly mounted therein and are run up on the cylinder to the extent that flanges 35F and 36F at the outer sides of the heads tightly engage the end walls of the cylinder 30. In the present instance, the heads 35 and 36 are formed with the flanges 26 and 27 described above, the flanges 26 and 27 being formed with apertures 26A and 27A for receiving the mounting bolts mentioned above.

The heads 35 and 36 have inner faces 40 and 41 which in part define and close off air-tight air chambers 42 and 43 at opposite ends of the cylinder bore 31, and a pair of blocks 45 and 46 of resilient material are mounted in the chambers 42 and 43 in contact with the inner faces 40 and 41 of the cylinder heads. These blocks silence operation of the vibrator 25 as will be explained. The blocks 45 and 46 have peripheral edges substantially complementary to the cylinder bore 31. This need not be a tight fit, especially since it is advantageous to be able to drop the blocks 45 and 46 into place from an open end of the cylinder 30 upon removing a head 35 or 36. The blocks 45 and 46 are preferably of an oil-resistant synthetic rubber, since it often happens that oil is entrained in the compressed air used to operate the vibrator.

A piston 50 is mounted within the bore of the cylinder 30 in the otherwise unoccupied area between the opposed inner faces of the blocks 45 and 46, which is to say that the opposed ends of the piston 50 are separated from the inner faces of the heads 35 and 36 respectively by the interposed resilient blocks 45 and 46. Thus, the piston 50 is of less axial dimension than the axial dimension separating the opposed inner faces of the blocks 45 and 46, enabling the piston 50 to reciprocate in alternate directions in the cylinder 30 and alternately strike and impact the blocks 45 and 46 to establish the essential vibrations. The piston 50 has an outer periphery which, except for the valving means formed thereon, is fully complementary to the bore 31. In other words, the piston 50 has a substantially air-tight fit in the cylinder 30 with respect to the portions of the piston 50 which engage the surface of the cylinder 30 defining the bore 31. The piston 50 in addition to establishing the essential vibrations also serves as a valve for reversing the flow of air under pressure to the chambers 42 and 43, and the manner in which such valving is accomplished will now be described.

The piston 50 is adapted to assume alternate axial positions in the bore 31, and is normally biased to one such position illustrated in Fig. 2 by a relatively strong coil spring 51. In the present instance, the spring 51 is disposed in the air chamber 43, one end thereof engaging the block 46 and the other end thereof being telescoped about a reduced boss 53 formed on the end of the piston 50 which corresponds to the air chamber 43. The boss 53 is reduced relative to a collar 54 on the piston 50, the collar 54 having an outer diameter corresponding to the diameter of the bore 31. An annular shoulder separates the base of the boss 53 from the collar 54, and the end of the spring 51 opposite the block 46 bears against the aforesaid shoulder. The collar 54 constitutes a valve member as will be explained.

The opposite end of the piston 50 is of identical construction, and the piston 50 as a matter of fact is symmetrical throughout so that the piston 50 is fully reversible insofar as mounting in the cylinder 30 is concerned. Thus, the end of the piston corresponding to the air chamber 42 includes a reduced boss 55 which merges into a valving collar 56 identical to the valving collar 54.

Inwardly of the collars 54 and 55, the piston 50 is reduced in diameter to afford reduced necks 57 and 58 which establish annular recesses in cooperation with the bore 31. The necks 57 and 58 are spaced by a relatively large collar 60 at the medial section of the piston 50. The collar 60 has an outer diameter substantially equal to the diameter of the bore 31 thereby having a sliding fit therewith and representing the primary guide for the piston 50.

In its normal position illustrated in Fig. 2, the spring 51 holds the exposed face of the boss 55 at the left end of the piston 50 against the block 45. In this position, the piston 50 establishes the essential valving arrangement enabling the piston 50 to be driven in the opposite direction when air under pressure is admitted to the chamber 42, causing the piston 50 to compress the spring 51 incidental to the exposed face of the piston boss 53 striking the block 46. When the boss 53 strikes the resilient block 46, the valving arrangement is immediately reversed, and forthwith piston 50 will then be driven in the opposite direction causing boss 55 to strike the resilient block 45. To enable repeated reciprocation of the piston 50 thus to be accomplished, the cylinder 30 is formed with a threaded inlet port 65, and a nipple 66 is threaded therein. The outer end of the nipple 66 is likewise threaded enabling an air line to be joined thereto, such air line of course being connected to a source of air under pressure as indicated by the arrow I in Figure 2. The thick wall of the cylinder 30 in a portion spaced from the bore 31 is formed with a transverse air passage having extensions extending in opposite directions at 67 and 68 respectively toward the chambers 42 and 43. The passages 67 and 68 communicate respectively with valve openings 70 and 71 formed in the cylinder 30, and each such valve opening is split or divided by respective projections 73 and 74 representing solid portions of the cylinder wall interposed between the air passages 67 and 68 and extensions 67A and 68A thereof. As shown in Fig. 2, the air passage extensions 67A and 68A also communicate respectively with the valve openings 70 and 71.

When the piston 50 is in the normal position shown in Fig. 2, the valve opening 70 is spanned by the annular valving recess defined by the reduced piston neck 58, whereby the air passage 67A communicates with the air passage 67. At this time, air passages 68 and 68A are out of communication because the opening 71 is blocked by the collar 54. In the other of its two positions whereat boss 53 engages block 46, the piston 50 reverses such valving, namely, opening 70 is blocked by the collar 56, thereby disrupting communication between the passages 67 and 67A, whereas the annular portion 57 of the piston 50 spans valve opening 71 thereby placing the passages 68 and 68A in communication.

The air passage 67A at the end opposite the projection 73 opens into the air chamber 42. Likewise, the air passage 68A opens into the air chamber 43. It remains only to be pointed out that each air chamber is adapted to be vented, that is, each air chamber 42 and 43 is provided with an air outlet enabling air to exhaust therefrom. Thus, as shown in Figs. 2 and 3, each air chamber 42 and 43 includes a plurality of aligned air outlets or exhaust ports 75 and 76. When the piston 50 is in its normal position shown in Fig. 2, the outlet ports 75 associated with the air chamber 42 are blocked off by the collar 56 on the piston 50, whereas at this time the outlet ports 76 associated with the air chamber 43 vent chamber 43 to the atmosphere inasmuch as it is the reduced boss 53 on the piston 50 which is aligned with the outlet ports 76 at this time. A plurality of outlet ports are afforded as shown in Fig. 3 to enable each air chamber to quickly exhaust.

Having now described the essential construction of the cylinder 30 and its piston 50 from the standpoint of the various inlet and outlet ports, air passages and valving means on the piston 50, operation of the vibrator is as follows: Upon admitting air under pressure into the inlet port 65 as indicated by the arrow I in Fig. 2, air under pressure flows instantly around the projection 73 and into chamber 42. Air under pressure in passage 68 on the other hand is blocked off from passage 68A by the collar 54 which spans the end of passage 68 terminating at the projection 74. Air chamber 43 is exposed to its exhaust ports as indicated by the arrow E in Fig. 2. Hence, the piston will be shifted rapidly to the right as viewed in Fig. 2, causing the boss 53 to impact the block 46. This is of course an exceedingly rapid motion, and when such impact occurs the valves are reversed, causing air chamber 42 to be exposed to its exhaust ports 75 and blocked off from air under pressure in passage 67, while at the same time air under pressure is admitted to chamber 43 now blocked off from its exhaust ports; and the piston 50 is thereupon immediately reversed. So long as air under pressure is admitted to the nipple 66, the piston 50 will continue to reciprocate at an exceedingly rapid rate, and at each end of the stroke the corresponding one of the blocks 45 and 46 is struck with a violent force setting up the rapid rate of vibrations desired. Under the present invention, however, the bosses 53 and 55 do not strike the inner faces of the heads 35 and 36 as in a conventional vibrator. Accordingly, under the present invention, the noise of the vibrator is greatly diminished, there is no peening or direct impact wear between the piston 50 and the cylinder heads 35 and 36, and the threads 31T are not stressed.

Hence, while we have illustrated and described a preferred embodiment of our invention, it is to be understood that this is capable of variation and modification, and we therefore do not wish to be limited to the precise details set forth, but desire to avail ourselves of such changes and alterations as fall within the purview of the following claim.

We claim:

In an air-operated vibrator for vibrating molds and the like, means affording a cylinder, a piston mounted in the bore of said cylinder for reciprocation therein, said cylinder including heads threadedly mounted in the opposite ends thereof closing off a pair of chambers in the cylinder at opposite ends of the piston for containing air under pressure, said piston having opposed ends of reduced diameter communicating with said chambers, said cylinder being provided with inlet and outlet ports adapted to communicate with said chambers, said cylinder having an elongated air passage connected at opposite ends to said inlet ports, means for admitting air under pressure to said passage, said passage having a pair of valve openings respectively located on opposite sides of said admitting means and which communicate with the bore of said cylinder, said valve openings each being split by a projection, a spring in one of said chambers concentrically surrounding one of the reduced ends of said piston for biasing the piston to one position whereat one of said chambers alone communicates with an outlet port and the other of said chambers alone communicates with an inlet port, said piston being adapted to be shifted by air under pressure in one of said chambers against the action of said spring to a second position whereat said one chamber alone communicates with an inlet port, and whereat said other chamber alone communicates with an outlet port, the faces of said heads defining said chambers being faced with resilient blocks adapted to be struck by the ends of said piston during reciprocation thereof, said piston having spaced annular recesses formed thereabout defining annular collars serving as valve means on the piston controlling opening and closing of said outlet ports, and said collars and said annular recesses being of a width to span said valve openings to control opening and closing thereof.

References Cited in the file of this patent

UNITED STATES PATENTS

| | | |
|---|---|---|
| 723,025 | Resor | Mar. 17, 1903 |
| 1,117,884 | Montgomery | Nov. 17, 1914 |
| 1,336,921 | Pickop | Apr. 13, 1920 |
| 1,485,486 | Gates | Mar. 11, 1924 |
| 1,911,967 | Pickop | May 30, 1933 |